United States Patent
Lee et al.

(10) Patent No.: US 7,760,974 B2
(45) Date of Patent: Jul. 20, 2010

(54) SILICON ARRAYED WAVEGUIDE GRATING DEVICE FOR REDUCING EFFECTIVE REFRACTIVE INDEX VARIATION OF OPTICAL WAVEGUIDE ACCORDING TO TEMPERATURE

(75) Inventors: Jong Moo Lee, Daejeon (KR); Duk Jun Kim, Daejeon (KR); Junghyung Pyo, Seoul (KR); Gyungock Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 259 days.

(21) Appl. No.: 11/828,418

(22) Filed: Jul. 26, 2007

(65) Prior Publication Data

US 2008/0037936 A1 Feb. 14, 2008

(30) Foreign Application Priority Data

Aug. 11, 2006 (KR) ............... 10-2006-0076364

(51) Int. Cl.
G02B 6/34 (2006.01)
(52) U.S. Cl. .................................. 385/37; 385/132
(58) Field of Classification Search .............. 385/37, 385/132
See application file for complete search history.

(56) References Cited

U.S. PATENT DOCUMENTS

| 6,519,380 | B2 | 2/2003 | Dawes et al. | |
|---|---|---|---|---|
| 6,574,409 | B1 | 6/2003 | Moroni et al. | |
| 6,728,442 | B2 * | 4/2004 | Missey et al. | 385/37 |
| 6,741,772 | B2 * | 5/2004 | Ide | 385/37 |
| 6,990,283 | B2 | 1/2006 | Lee et al. | |
| 7,440,650 | B2 * | 10/2008 | Fondeur et al. | 385/18 |
| 2005/0129363 | A1 * | 6/2005 | McGreer | 385/37 |

FOREIGN PATENT DOCUMENTS

| JP | 2003-322737 | * 11/2003 |
|---|---|---|
| KR | 1020040025820 | 3/2004 |
| KR | 1020040056272 | 6/2004 |
| KR | 1020050114913 | 12/2005 |
| KR | 1020060061630 | 6/2006 |

OTHER PUBLICATIONS

Kokubun, Y. et al. "Temperature-independent optical filter at 1.55 μm wavelength using a silica-based athermal waveguide." Electronics Letters, Feb. 19, 1998, vol. 34, No. 4. pp. 367-369.

Inoue, Y. et al. "Athermal silica-based arrayed-waveguide grating multiplexer." Electronics Letters, Nov. 6, 1997, vol. 33, No. 23. pp. 1945-1947.

(Continued)

Primary Examiner—Charlie Peng
(74) Attorney, Agent, or Firm—Ladas & Parry LLP

(57) ABSTRACT

Provided is a silicon array waveguide grating (AWG) device comprising a silicon array waveguide in which a plurality of optical waveguides formed of a lower cladding layer, a silicon core, and an upper cladding layer are arranged, wherein the variation of the refractive index of the silicon core is positive, and the upper cladding layer is formed of polymer, the variation of refractive index of which according to temperature is negative, which is opposite to the silicon core, and the cross-section of the silicon core varies between different areas to adjust the variation of the effective refractive index of the optical waveguide according to temperature.

13 Claims, 4 Drawing Sheets

OTHER PUBLICATIONS

Shoji, T. et al. "Low loss mode size converter from 0.3μm square Si wire waveguides to singlemode fibres." Electronics Letters, Dec. 5, 2002, vol. 38, No. 25. pp. 1669-1670.

Kim, Duk-Jun. "Thermal Behavior of Arrayed-Waveguide Grating Made of Silica/Polymer Hybrid Waveguide." ETRI Journal, vol. 26, No. 6, Dec. 2004. pp. 661-664.

* cited by examiner

FIG. 7

| Structure of optical waveguide | N_Si | N_pol | Neff | Neff Variation |
|---|---|---|---|---|
| 200 x 200 nm | 3.5 | 1.45 | 1.47781262094 | |
| | 3.5 + 0.001 | 1.45 | 1.47788476884 | +0.0000721479 |
| | 3.5 + 0.001 | 1.45 −0.001 | 1.47720662191 | −0.000605999 |
| 400 x 200 nm | 3.5 | 1.45 | 2.17482236695 | |
| | 3.5 + 0.001 | 1.45 | 2.17584625937 | +0.001023892 |
| | 3.5 + 0.001 | 1.45 −0.001 | 2.17553578666 | +0.00071342 |

SILICON ARRAYED WAVEGUIDE GRATING DEVICE FOR REDUCING EFFECTIVE REFRACTIVE INDEX VARIATION OF OPTICAL WAVEGUIDE ACCORDING TO TEMPERATURE

CROSS-REFERENCE TO RELATED PATENT APPLICATION

This application claims the benefit of Korean Patent Application No. 10-2006-0076364, filed on Aug. 11, 2006, in the Korean Intellectual Property Office, the disclosure of which is incorporated herein in its entirety by reference.

BACKGROUND OF THE INVENTION

1. Field of the Invention

The present invention relates to an optical device, and more particularly, to a silicon array waveguide grating (AWG) device.

2. Description of the Related Art

Array waveguide grating (AWG) devices are conventionally formed of silica, but since semiconductor chips are formed of silicon, there is a demand for silicon AWG devices, formed of silicon.

Silicon AWG devices require optical wiring for high speed silicon based semiconductor devices such as CPUs. In other words, silicon AWG devices require optical wiring between semiconductor chips based on silicon.

However, the variation of refractive index of a silicon material is 0.00018/° C., which is 18 times that of a silica material, which is 0.00001/° C. Therefore the optical waveguide of a silicon AWG device has an extreme variation of its effective refractive index according to temperature compared to a silica AWG device. This causes a variation of the center wavelength according to temperature as great as 0.18 nm/° C., and it becomes difficult to use the silicon AWG device.

SUMMARY OF THE INVENTION

The present invention provides a silicon array waveguide grating (AWG) device which can reduce the variation of the effective refractive index of an optical waveguide according to temperature.

According to an aspect of the present invention, a silicon AWG device includes a silicon array waveguide in which a plurality of optical waveguides formed of a lower cladding layer, a silicon core, and an upper cladding layer are arranged. In the silicon AWG device, the variation of the refractive index of the silicon core is positive, and the upper cladding layer is formed of polymer, the variation of refractive index of which according to temperature is negative, which is opposite to the silicon core, and the cross-section of the silicon core is varies between different areas. The silicon AWG device adjusts the variation of the effective refractive index of the optical waveguide according to temperature.

According to another aspect of the present invention, a silicon AWG device includes a silicon array waveguide in which a plurality of optical waveguides formed of a lower cladding layer, a silicon core, and an upper cladding layer are arranged. In the silicon AWG device, the variation of the refractive index of the silicon core is positive, and the upper cladding layer is formed of polymer, the variation of refractive index of which according to temperature is negative, which is opposite to the silicon core, and the cross-section of the silicon core is formed of a first portion having a cross-section of a first value and a second portion having a cross-section of a second value that is smaller than the first value.

In the silicon AWG device, the optical mode propagating through the optical waveguide in the first portion is limited to the silicon core, and the optical mode proceeding the optical waveguide in the second portion extends into the upper cladding layer and the lower cladding layer. The silicon array waveguide grating (AWG) device adjusts the variation of the effective refractive index of the optical waveguide according to temperature using the upper cladding layer.

According to another aspect of the present invention, a silicon AWG device includes a silicon array waveguide in which a plurality of optical waveguides formed of a lower cladding layer, a silicon core, and an upper cladding layer are arranged. In the silicon AWG device, the variation of the refractive index of the silicon core is positive, and the upper cladding layer is formed of polymer, the variation of refractive index of which according to temperature is negative, which is opposite to the silicon core, and the cross-section of the silicon core is formed of a straight line portion where light propagates in a straight line and a curved line portion where light propagates in a curved line.

In the silicon AWG device, the cross-section of the straight line portion of the optical waveguide is smaller than the cross-section of the silicon core of the curved line such that the variation of the effective refractive index of the optical waveguide according to temperature is influenced more by the upper cladding layer than the silicon core. Thus, the silicon AWG device can suppress dependence of the optical waveguide on temperature.

BRIEF DESCRIPTION OF THE DRAWINGS

The above and other features and advantages of the present invention will become more apparent by describing in detail exemplary embodiments thereof with reference to the attached drawings in which:

FIG. 7 illustrates the simulation result of the variation of the effective refractive index of the optical waveguide employed in the silicon AWG device according to the present invention according to the temperature.

DETAILED DESCRIPTION OF THE INVENTION

Figure 1:
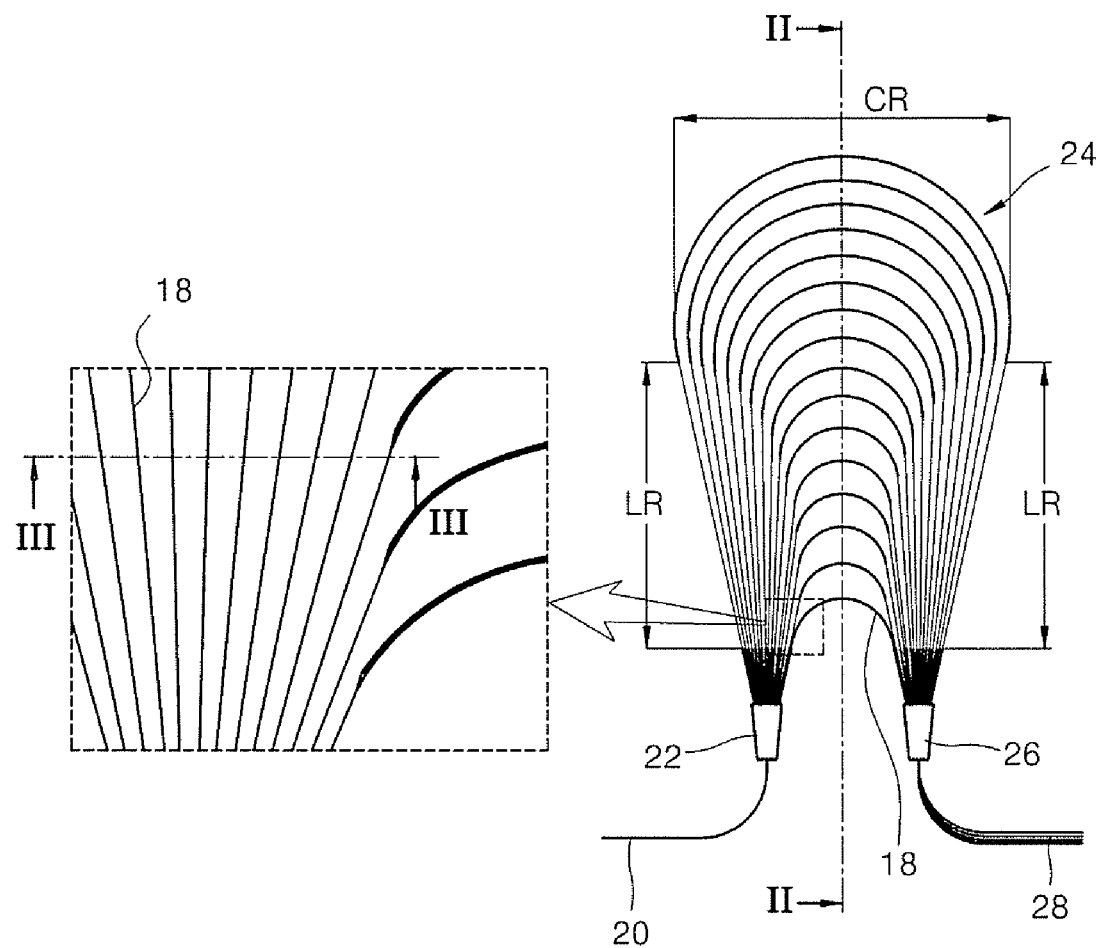
FIG. 1 includes a plane view and a partial extended view of a silicon array waveguide (AWG) device according to an embodiment of the present invention.

The present invention will now be described more fully with reference to the accompanying drawings, in which exemplary embodiments of the invention are shown. The invention may, however, be embodied in many different forms, and should not be construed as being limited to the embodiments set forth herein; rather, these embodiments are provided so that this disclosure will be thorough and complete, and will fully convey the concept of the invention to those skilled in the art. In the drawings, the sizes and thicknesses of layers and regions are exaggerated for clarity.

A silicon array waveguide grating (AWG) device according to an embodiment of the present invention uses polymer as an upper cladding layer to reduce the effective refractive index variation of the optical waveguide according to temperature. The variation of the refractive index of the polymer according to temperature is a negative value of −0.0001 to −0.0002/° C., which is opposite to the variation of refractive index of the silicon of a silicon core, which is a positive value of 0.00018/° C., and thus may reduce the dependence of the silicon AWG device on temperature.

However, the refractive index of the silicon of the silicon core is 3.5, which is very high, and when the silicon AWG device is formed of a silicon core and an upper cladding layer of polymer, most of the optical mode is distributed in the silicon core and very little in the upper cladding layer. Thus even when the upper cladding layer is formed of polymer, light is concentrated in the silicon core of the silicon AWG device and the silicon AWG device is not affected by the upper cladding layer, and thus cannot substantially reduce the variation of the effective refractive index according to temperature.

To solve this problem, the silicon AWG device that can control or reduce the variation of the effective refractive index, in that propagated light is influenced by an upper cladding layer formed of polymer, is suggested in an embodiment of in the present invention. The silicon AWG device is formed of an upper cladding layer formed of polymer, and the cross-section of a silicon core varies in different areas of an optical waveguide to control or reduce the variation of the effective refractive index of the optical waveguide according to temperature.

For example, the silicon AWG device according to the current embodiment of the present invention has an optical waveguide formed of a straight line portion which propagates light in a straight line and a curved line portion which propagates light in a curved line, and the cross-section of the silicon core in the straight line portion of the optical waveguide is smaller than in the curved line portion. Thus the variation of the effective refractive index of the optical waveguide according to temperature is influenced more by the upper cladding layer than the silicon core, thereby suppressing the dependence of the optical waveguide on temperature.

Accordingly, the silicon AWG device according to the current embodiment of the present invention controls or reduces the variation of the effective refractive index of the optical waveguide according to temperature, to reduce the dependence of the silicon AWG device on temperature. A silicon AWG device based on this concept can be manufactured in various forms, and the silicon AWG device suggested below is merely an example. This concept can be applied not only to the silicon AWG device but also to a ring resonator WDM device and a grating type WDM device.

FIG. 1 includes a plane view and a partial extended view of a silicon array waveguide (AWG) device according to an embodiment of the present invention.

The silicon AWG device according to the current embodiment of the present invention includes an input waveguide 20 through which light is input by an optical fiber (not shown), and a first coupler 22 connected to an end of the input waveguide 20. A silicon array optical waveguide 24 is connected to an end of the first coupler 22. The silicon array optical waveguide 24 includes a plurality of optical waveguides 18. The optical waveguide is formed of a straight line portion (LR) which propagates light in a straight line, and a curved line portion (CR) which propagates light in a curved line. The CR has a minimum curvature radius to reduce the size of the device.

The cross-section of the silicon array optical waveguide 24 will be described in detail with reference to FIGS. 2 through 4. A second coupler 26 is connected to an end of the silicon array optical waveguide 24. An output waveguide 28 is connected to an end of the second coupler 26. FIG. 1 illustrates the propagation of light through the silicon array optical waveguide 24.

Figure 2:
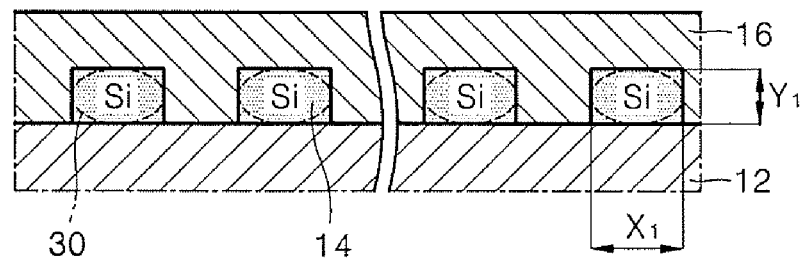
FIGS. 2 and 3 are cross-sectional views of the silicon AWG device according to an embodiment of the present invention.
Figure 3:
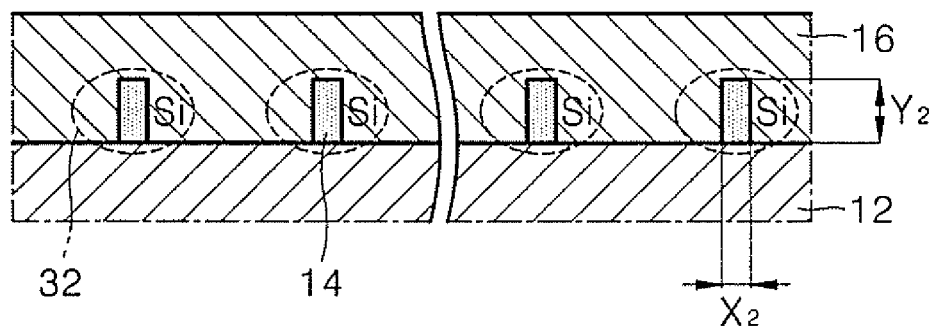

FIGS. 2 and 3 are cross-sectional views of the silicon AWG device according to an embodiment of the present invention.

FIG. 2 illustrates the cross-section of the CR of the silicon array optical waveguide 24 along a line II-II of FIG. 1. FIG. 3 illustrates the cross-section of the LR of the silicon array optical waveguide 24 along a line III-III of FIG. 1. Each optical waveguide 18 of the silicon array optical waveguide 24 includes a lower cladding layer 12, a silicon core 14, and an upper cladding layer 16, on a substrate (not shown). In FIGS. 2 and 3, an air layer is over the upper cladding layer 16.

The lower cladding layer 12 is formed of silica ($SiO_2$), and the upper cladding layer 16 is formed of polymer, for example, PMMA, polyimide, polyether, etc. The reason that the upper cladding layer 16 is formed of polymer is that the variation of the refractive index of the polymer according to temperature is negative, −0.0001 to −0.0002/° C., which is opposite to that of silicon, 0.00018/° C., which is positive, and thus the dependence of the silicon AWG device on temperature can be reduced. This reduces the variation of the effective refractive index according to temperature, and thus also the variation of the center wavelength during light propagation.

In addition, the cross-section of the silicon core 14 is different in each area of light propagation to reduce the dependence of the optical waveguide 18 on temperature as described below. FIGS. 2 and 3 illustrate that the cross-section of the silicon core 14 is different in the CR and the LR, but the cross-section of the silicon core 14 can also be different in other portions.

In the CR of the silicon array optical waveguide 24, the silicon core 14 has a size since the curvature radius of the CR is minimized to make the device compact, as illustrated in FIG. 2. Thus, it is limited to reduce the size of the silicon core 14. An optical mode 30 of light propagation is limited mainly to the silicon core 14 as illustrated in FIG. 2. In the current embodiment of the present invention, in the CR of the silicon array optical waveguide 24, the cross-section of the silicon core 14 has a width X1 of 400 nm and a height Y1 of 200 nm, as first values.

In the LR of the silicon array optical waveguide 24, the cross-section of the silicon core 14 is formed as small as possible, smaller than in the CR, as illustrated in FIG. 3. Then an optical mode 32 during light propagation is not limited to the silicon core 14 but extends to the upper cladding layer 16 formed of polymer or the lower cladding layer 12, as illustrated in FIG. 3. Accordingly, the variation of the effective refractive index according to temperature is influenced more by the upper cladding layer formed of polymer. In the current embodiment of the present invention, in the LR of the silicon array optical waveguide 24, the cross-section of the silicon core 14 has a width X2 of 200 nm or 100 nm and a height Y2 of 200 nm, which are second values and are smaller than the first values. The width X2 of the silicon core 14 of the optical waveguide 18 is smaller in the LR than in the CR of the silicon array optical waveguide 24.

Consequently, when the cross-section, particularly the width, of the silicon core 14 is smaller in the LR than in the CR of the silicon array optical waveguide 24, the variation of the effective refractive index of the optical waveguide 18 according to temperature is influenced more by the upper cladding layer 16 formed of polymer than the silicon core 14, thereby suppressing the dependence of the optical waveguide 18 on temperature.

In particular, when the cross-section, for example the width, of the silicon core 14 is different in each area of the silicon array optical waveguide 24, the variation of the effective refractive index of the optical waveguide 18 according to temperature is influenced more by the upper cladding layer 16 formed of polymer than the silicon core 14, thereby suppressing the dependence of the optical waveguide 18 on temperature.

Figure 4:
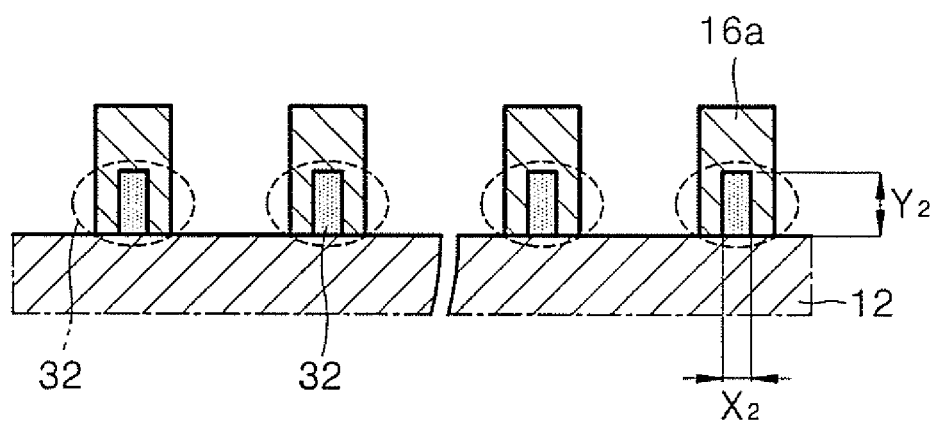
FIG. 4 is a cross-sectional view of a silicon AWG device according to another embodiment of the present invention.

FIG. 4 is a cross-sectional view of a silicon AWG device according to another embodiment of the present invention.

In FIG. 4, reference numerals common to FIGS. 2 and 3 denote the same elements. FIG. 4 is a cross-section of the LR of the silicon array optical waveguide 24 in FIG. 1 cut long a line III-III. The silicon AWG device in FIG. 4 is the same as that in FIG. 3 except that an upper cladding layer 16a is separated in each optical waveguide 18.

When the upper cladding layer 16a is formed on each optical waveguide 18, interference between the optical waveguides can be reduced. Furthermore, when the cross-section of the silicon core 14 of the optical waveguide 18 is reduced more than a cut-off condition needed for optical propagation, light may be not propagate through the optical waveguide 18. Then the separate upper cladding layer 16a may be used as a second core region in which light propagates.

Figure 5:
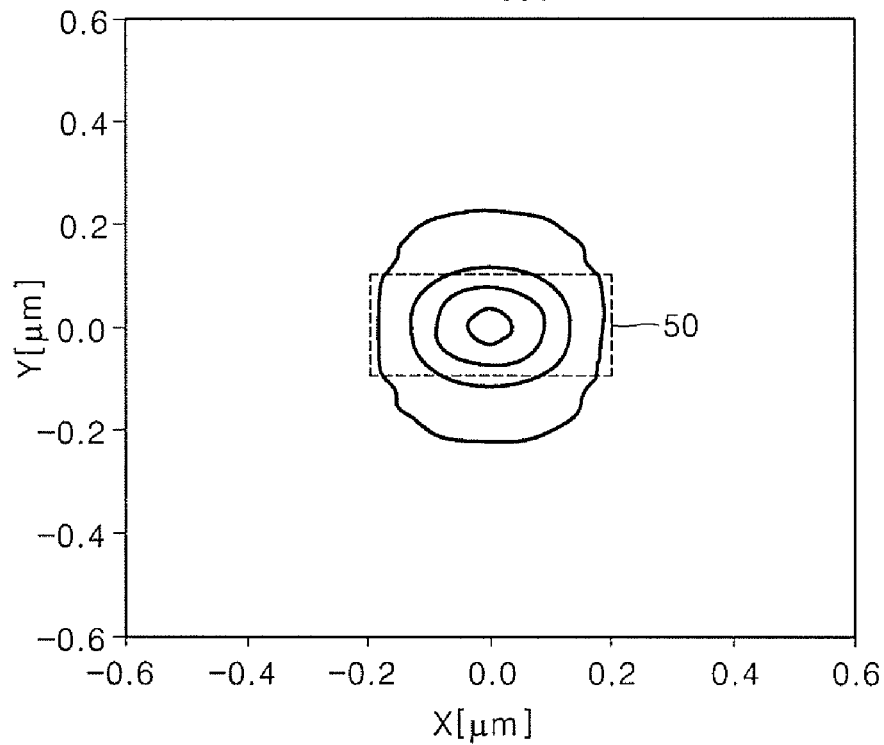
FIGS. 5 and 6 illustrate the simulation of the mode distribution of an optical waveguide employed in the silicon AWG device according to the present invention.
Figure 6:
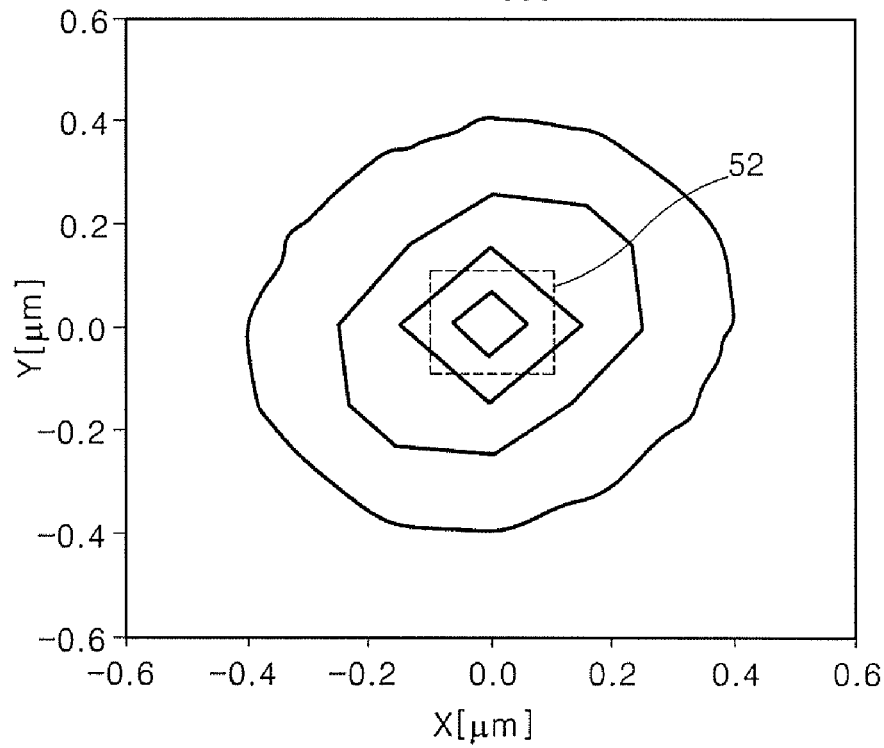

FIGS. 5 and 6 illustrate the simulation of the mode distribution of an optical waveguide employed in the silicon AWG device according to the present invention.

FIG. 5 illustrates the simulation result of the optical mode distribution of the cross-sectional waveguide having a width X1 of 400 nm and a height Y1 of 200 nm which was described with reference to FIG. 2, and FIG. 6 illustrates the simulation result of the optical mode distribution of the cross-sectional waveguide having a width X2 of 200 nm and a height Y2 of 200 nm which was described with reference to FIG. 3. In FIGS. 5 and 6, it is assumed that the refractive index of the silicon core is 3.5, the refractive index of the polymer of the upper cladding layer is 1.45, and the effective refractive index is 1.478.

In the waveguide of 400 nm×200 nm in FIG. 5, most of the optical mode is distributed inside the marked portion 50 of the silicon core. On the other hand, in the cross-sectional waveguide of 200 nm×200 nm, most of the optical mode is distributed outside the marked portion 52, which is the outside of the silicon core, that is, in the upper and lower cladding layers.

As can be seen from FIGS. 5 and 6, as the cross-section, that is, the width, of the silicon core is reduced, the optical mode is extended. Thus as the cross-section of the silicon core is reduced, the optical mode is influenced more by the upper cladding layer formed of polymer than the silicon core.

However, when the cross-section of the silicon core becomes too narrow, a cut-off condition may be caused in which light does not propagate, thus the cross-section of the silicon core can be reduced until reaching the cut-off condition. Of course, when the cut-off condition is satisfied, light can be propagated using the upper cladding layer 16a, which is separated for each waveguide, as a core region.

FIG. 7 illustrates the simulation result of the variation of the effective refractive index of the optical waveguide employed in the silicon AWG device according to the present invention according to temperature. In FIG. 7, N_Si denotes the refractive index of silicon, and N_pol denotes the refractive index of polymer, and Neff denotes the effective refractive index.

FIG. 7 illustrates the simulation result of the variation of the effective refractive index of a 400 nm (X1)×200 nm (Y1) cross-sectional waveguide and a 200 nm (X2)×200 nm (Y2) cross-sectional waveguide when the variations of the refractive index of the silicon core and the upper cladding layer formed of polymer are each +0.001 and −0.001 according to the temperature. The variation values +0.001 and −0.001 of the silicon core and the upper cladding layer formed of polymer are at a variation of temperature of about 6° C.

As is to be seen in FIG. 7, in the 400 nm×200 nm cross-sectional waveguide, the variation of the effective refractive index Neff is hardly related to the variation of the refractive index of the upper cladding layer and varies similarly to the refractive index of the silicon core. On the other hand, in the 200 nm×200 nm cross-sectional waveguide, the variation of the effective refractive index is more sensitive to the variation of the refractive index of the upper cladding layer formed of polymer. Thus when the cross-section of the silicon core is reduced, the dependence on temperature of the silicon AWG device can be controlled or suppressed by the upper cladding layer formed of polymer.

In the silicon AWG device according to the present invention, the upper cladding layer is formed of polymer and the cross-section of the silicon core is formed differently for each area of the optical waveguide to control the variation of the effective refractive index of the optical waveguide according to temperature, thereby reducing the dependence of the optical waveguide on temperature.

Also, the silicon AWG device according to the present invention includes the upper cladding layer formed of polymer and the optical waveguide formed of a straight line portion propagating light in a straight line and a curved line portion that is connected to the straight line and propagates light in a curved line. The cross-section of the silicon core in the straight line portion of the optical waveguide is smaller than the cross-section of the silicon core in the curved line portion, so that the variation of the effective refractive index of the optical waveguide according to temperature is influenced more by the upper cladding layer than the silicon core, thereby suppressing the dependence of the optical waveguide on the temperature.

As a result, according to the present invention, the silicon AWG device can reduce the variation of the effective refractive index of the optical waveguide according to temperature, thereby reducing the variation of the center wavelength according to temperature.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A silicon array waveguide grating (AWG) device comprising:
    a plurality of optical waveguides, each optical waveguide comprising:
        two linear end regions and a curve region there between;
        a lower cladding layer;
        a silicon core on the lower cladding layer wherein the silicon core has a narrower cross sectional width in the linear regions than in the curve region such that the silicon core of each optical waveguide has substantially the same and uniform cross sectional width in the linear regions and substantially the same and uniform cross sectional width in the curve region as the silicon core of every other optical waveguide of the plurality of optical waveguides; and an upper cladding layer on the silicon core, wherein the variation of the refractive index as a function of temperature (dN/dT) of the silicon core has a positive value, and the dN/dT of the upper cladding layer has a negative value which is substantially opposite to the dN/dT of the silicon core such that the dN/dT of each optical waveguide is substantially zero.

2. The silicon AWG device of claim 1, wherein the upper cladding layer is formed of a polymer and is formed over all the optical waveguides or formed over each of the optical waveguides.

3. The silicon AWG device of claim 1, wherein the lower cladding comprises silica.

4. The silicon AWG device of claim 1, wherein the dN/dT of the silicon core is positive at about 0.00018/° C., and the dN/dT of the polymer forming the upper cladding layer is negative from between about −0.0001 to −0.0002/° C.

5. The silicon AWG device of claim 1, wherein the width of the silicon core in the curve region is about 400 nm and the width of the silicon core in the linear regions is about 200 nm to about 100 nm.

6. The silicon AWG device of claim 1, further comprising:
an input waveguide;
a first coupler connected to the input waveguide;
the optical waveguides connected to the first coupler;
a second coupler connected to the optical waveguides; and
an output waveguide connected to the second coupler.

7. The silicon AWG device of claim 1, wherein the upper cladding comprises a polymer selected from the group consisting of polymethylmethacrylate (PMMA), polyimide, polyether and admixtures thereof.

8. A silicon array waveguide grating (AWG) device comprising:
a plurality of optical waveguides, each optical waveguide comprising:
linear end regions and a curve region there between;
a lower cladding layer comprising silica;
a silicon core on the lower cladding layer wherein the silicon core has a narrower cross sectional width in the linear region than that of the curve region such that the silicon core of each optical waveguide has substantially the same and uniform cross sectional width in the linear regions and substantially the same and uniform cross sectional width in the curve region as the silicon core of every other optical waveguide of the plurality of optical waveguides, and
an upper cladding layer on the silicon core,
wherein the variation of the refractive index as a function of temperature (dN/dT) of the silicon core has a positive value, and the dN/dT of the upper cladding layer has a negative value which is substantially opposite to the dN/dT of the silicon core such that the dN/dT of each optical waveguide is substantially zero.

9. The silicon AWG device of claim 8, wherein the cross-sectional width of the silicon core in the linear region is about 200 nm or about 100 nm.

10. The silicon AWG device of claim 8, further comprising:
an input waveguide;
a first coupler connected to the input waveguide;
the optical waveguides are connected to the first coupler;
a second coupler connected to the optical waveguides; and
an output waveguide connected to the second coupler.

11. P, silicon array waveguide grating (AWG) device comprising:
a plurality of optical waveguides, each optical waveguide comprising:
linear end regions and a curve region therebetween;
a lower cladding layer;
a silicon core on the lower cladding layer wherein the silicon core has a narrower cross sectional width in the linear regions than in the curve region such that the silicon core of each optical waveguide has substantially the same and uniform cross sectional width in the linear regions and substantially the same and uniform cross sectional width in the curve region as the silicon core of every other optical waveguide of the plurality of optical waveguides; and
an upper cladding layer on the silicon core,
wherein the variation of the refractive index as a function of temperature. (dN/dT) of the silicon core has a positive value, and the dN/dT of the upper cladding layer is has a negative value which is substantially opposite to the dN/dT of the silicon core such that the dN/dT of each optical waveguide is substantially zero such that each optical waveguide substantially Suppresses a dependence of the optical waveguides on temperature.

12. The silicon AWG device of claim 11, wherein in the cross sectional width of the curve region is about 400 nm and the cross sectional width of the silicon core in the linear regions is about 200 nm or about 100 nm.

13. The silicon AWG device of claim 11, further comprising:
an input waveguide;
a first coupler connected to the input waveguide;
the optical waveguides connected to the first coupler;
a second coupler connected to the optical waveguides; and
an output waveguide connected to the second coupler.

* * * * *